United States Patent [19]
Goebel

[11] Patent Number: 5,477,728
[45] Date of Patent: Dec. 26, 1995

[54] METHOD AND APPARATUS FOR DRIVING A MOTOR VEHICLE WHEEL ON A MOTOR VEHICLE FOR UNBALANCE MEASUREMENT THEREOF

[75] Inventor: Eickhart Goebel, Pfungstadt, Germany

[73] Assignee: Hofmann Werkstatt-Technik GmbH, Pfungstadt, Germany

[21] Appl. No.: 111,816

[22] Filed: Aug. 25, 1993

[30] Foreign Application Priority Data

Aug. 25, 1992 [DE] Germany .......................... 42 28 143.1

[51] Int. Cl.⁶ .................................................. G01M 1/28
[52] U.S. Cl. ...................................... 73/457; 74/16
[58] Field of Search ........................... 73/457, 464, 478, 73/462; 74/16

[56] References Cited

U.S. PATENT DOCUMENTS

| | | | |
|---|---|---|---|
| 2,731,841 | 1/1956 | Merrill et al. | 73/457 |
| 3,911,751 | 10/1975 | Shooter et al. | 73/464 |
| 4,324,139 | 4/1982 | Mühlau | 73/457 |
| 4,956,998 | 9/1990 | Goebel | 73/457 |
| 4,980,621 | 12/1990 | Müller | 73/462 |

FOREIGN PATENT DOCUMENTS

| | | | |
|---|---|---|---|
| 0355304 | 2/1990 | European Pat. Off. | |
| 2127162 | 4/1984 | United Kingdom | 73/457 |

*Primary Examiner*—Hezron E. Williams
*Assistant Examiner*—Helen C. Kwok
*Attorney, Agent, or Firm*—Cushman Darby & Cushman

[57] ABSTRACT

A method and apparatus for driving a motor vehicle wheel mounted on a motor vehicle. The wheel is freely rotatable for unbalance measurement thereof a friction wheel driven by an electric motor that is pressed against the tire with varying pressure force. The respective peripheral speeds of the friction wheel and the vehicle wheel in relation to the contact periphery at which the friction wheel bears against the vehicle wheel are ascertained and the electric motor is regulated in a continuous or discontinuous mode in dependence on a difference between the two measured peripheral speeds.

16 Claims, 3 Drawing Sheets

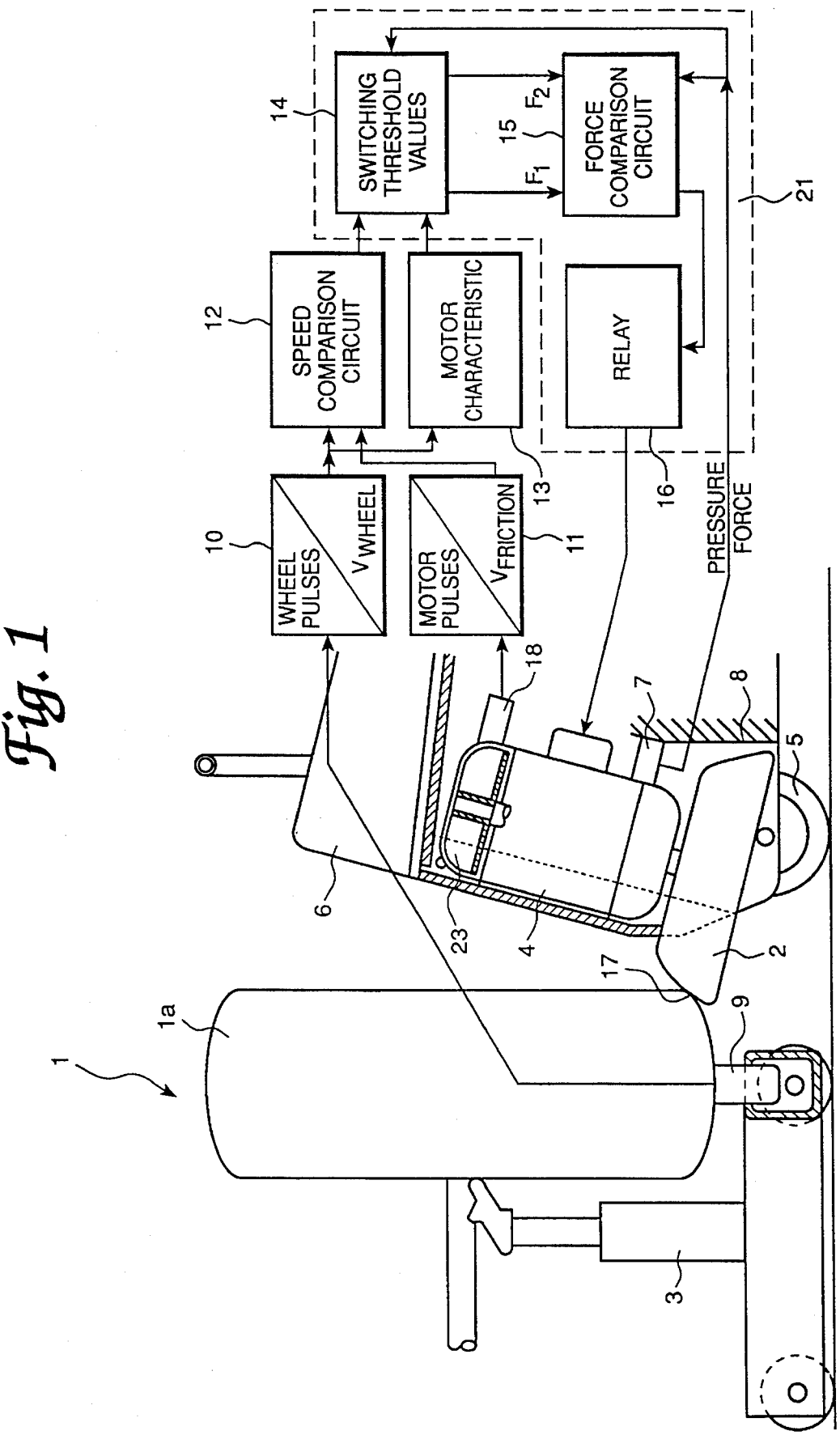

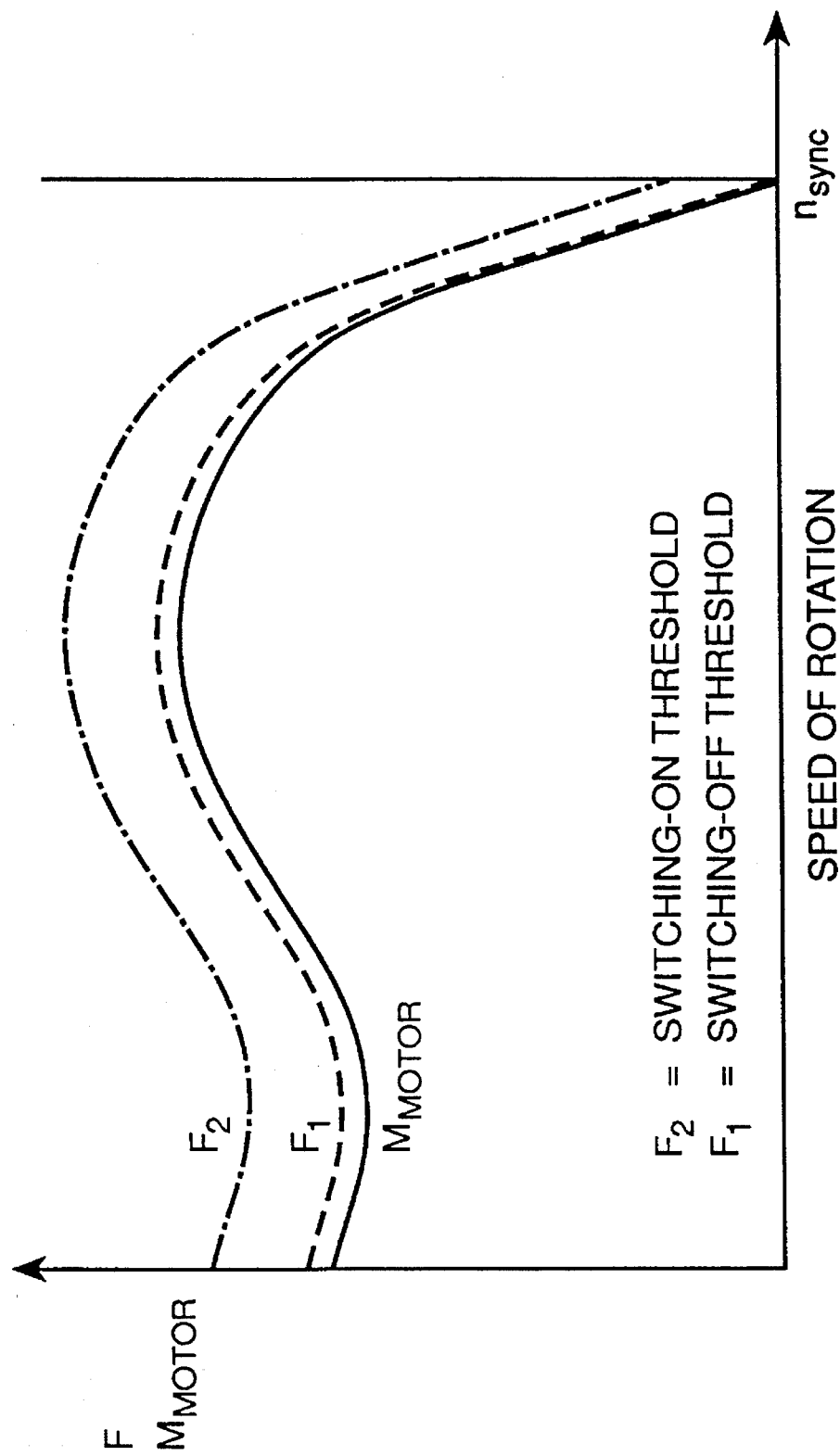

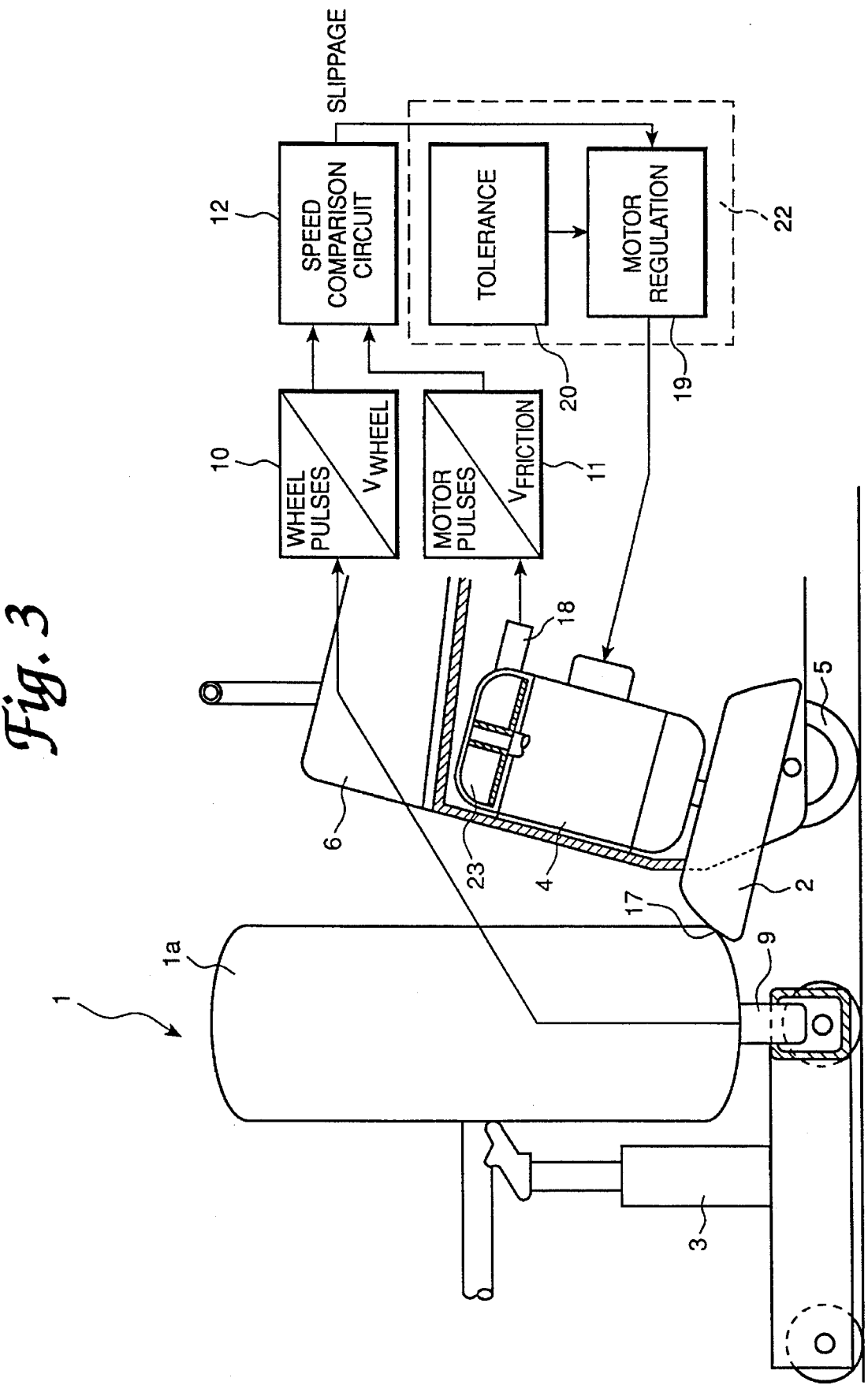

METHOD AND APPARATUS FOR DRIVING A MOTOR VEHICLE WHEEL ON A MOTOR VEHICLE FOR UNBALANCE MEASUREMENT THEREOF

BACKGROUND OF THE INVENTION

It is known to carry out an unbalance measurement operation on a motor vehicle wheel by driving the motor vehicle wheel in rotation while it remains mounted on the motor vehicle and raised on a suitable jack device and thus is freely rotatably. The motor vehicle wheel can be driven by means of a friction wheel which in turn is driven by an electric motor, with the friction wheel being pressed against the motor vehicle wheel with varying pressure forces. A method of that nature, and a suitable apparatus for carrying out the method, are to be found in DE 38 28 724 A1 (corresponding to EP 0 355 304A2 and U.S. Pat. No. 4,956,998). That situation involves determining unbalances of the motor vehicle wheel on the motor vehicle. As indicated above, to assure that the wheel whose unbalance is to be measured, which comprises a disk wheel or hub and a pneumatic tire fitted thereon, is freely rotatable, the wheel can be jacked up by a suitable jack device. So that the wheel can be rotated at the required speed, the friction wheel driven by the electric motor is pressed against the pneumatic tire. In order to provide for a slippage-free transmission of drive from the friction wheel to the pneumatic tire, the operating procedure involves using two given pressures or contact forces between the friction wheel and the pneumatic tire, which represent switching threshold values for switching the drive motor, and therewith the friction wheel, on and off. The required pressure force is of such a magnitude that, when the system is switched on, the drive moment produced by the drive motor is transmitted in a slippage-free manner to the motor vehicle wheel. When the system is switched off, a reduced drive or braking moment is similarly transmitted without slippage to the motor vehicle wheel. Attaining freedom from slippage, in such a procedure, is difficult because the switching forces have to be established in dependence on the maximum motor moment or torque and the lowest frictional value between the friction wheel and the motor vehicle wheel whose unbalance is to be measured. In that respect, the drive moment or torque produced by the motor is generally dependent on a number of factors such as the speed of the motor, the operating voltage (at least about 360 V, with a maximum of about 440 V), and the motor temperature. The frictional value as between the motor vehicle wheel, specifically the pneumatic tire, and the friction wheel is also dependent, for example, on the state of the tire, for example whether it is wet or dry, and the like.

SUMMARY OF THE INVENTION

An object of the present invention is to provide a method of driving a motor vehicle wheel so that its unbalance can be measured by using a friction wheel without slippage therebetween.

Another object of the present invention is to provide a method of driving a motor vehicle wheel to permit unbalance measurement by means of a friction wheel, which affords regulation of the operating system in such a way as to at least minimize slippage in the transmission of drive or braking forces between the friction wheel and the motor vehicle wheel.

Still another object of the present invention is to provide an apparatus for driving a motor vehicle wheel, to measure its unbalance, by a driven friction wheel adapted to substantially eliminate slippage between the friction wheel and the motor vehicle wheel driven thereby.

In accordance with the principles of the present invention the foregoing and other objects are attained by the method and apparatus in accordance with the invention as set forth herein.

The invention therefore provides that the peripheral speeds of The friction wheel and the motor vehicle wheel are ascertained, relative to the contact periphery at which the friction wheel bears against the motor vehicle wheel, for example and more specifically against a pneumatic tire thereof. The torque or speed of rotation of the electric motor driving the friction wheel is then regulated in dependence on a difference between the two measured peripheral speeds. The regulation action may involve a discontinuous regulation, in which the system is switched on and off or, alternatively, a continuous or steadily variable regulation. The steady regulation procedure is preferably carried out in such a way that the difference between the two measured peripheral speeds remains substantially within a tolerance range. In that respect, it is possible to use a phase-angle control system or frequency regulation by means of a frequency converter.

For the purposes of detecting the peripheral speed of the motor vehicle wheel, a sensing roller can be arranged to bear against the motor vehicle wheel. The sensing roller is preferably applied against the tread surface of the pneumatic tire of the motor vehicle wheel, but it will be noted that the sensing roller can also be applied to any other suitable location on the motor vehicle wheel, for example, either on the wheel or hub itself or on the pneumatic tire. It is also possible to provide for contact-less sensing, for example using an optical system. When using a contact-less sensing mode, the system can detect surface structures on the wheel, for example, on the metal hub itself or on the pneumatic tire. In that case, the peripheral speed of the wheel can be ascertained from repetition of the complete structure pattern detected or from repetition of, for example, prominent structural configurations, in each unit of time.

The sensing roller or, for example, the optical sensing device produces electrical signals which are proportional to the peripheral speed. Such signals are then fed to an evaluation means which is associated with the speed measuring device. There the electrical signals are related to the radius of the above-mentioned contact periphery at which the friction wheel is in contact with the motor vehicle wheel, around the axis of rotation of the wheel. The evaluation means, in the form of a suitable circuit, supplies an output signal, in the form of a peripheral speed signal, which is proportional to the peripheral speed of the motor vehicle wheel in the contact periphery region.

In the case of the above-mentioned discontinuous regulation mode, that is to say when the system is regulated by the electric motor current being suitably switched on and off, specific pressure or contact forces between the friction wheel and the motor vehicle wheel can be used as switching threshold values for switching the motor current on and off, in which respect at least the switching-on threshold value is variable, being adapted to the torque-speed characteristic of the electric motor. It is also possible for both the switching threshold values to be adapted to the torque-speed characteristic of the electric motor. That provides for automatic adaptation of the torque-speed characteristic of the motor in dependence on the conditions which currently obtain such as operating voltage, temperature and friction as between the friction wheel and the motor vehicle wheel.

The difference between the two peripheral speeds of the friction wheel and the motor vehicle wheel, at the contact periphery therebetween, corresponds to any slippage between the motor vehicle wheel and the friction wheel, and that difference is utilized for regulating the motor.

Besides the above-mentioned discontinuous motor current regulation mode, which involves switching the motor current on and off, it is also possible to provide for continuous or steady regulation of the motor. In this form of regulator, the drive moment or the speed of rotation of the electric motor is regulated so that it is possible for the torque of the motor to be constantly adapted to the currently obtaining pressure force with which the friction wheel is pressed against the motor vehicle wheel, more particularly the pneumatic tire thereof. This assures that any slippage or difference in peripheral speeds between the friction wheel and the motor vehicle wheel remains at least substantially within an established tolerance range. In that way the motor characteristic, operating voltage, motor temperature and different frictional values as between the friction wheel and the motor vehicle wheel are automatically taken into account. There is thus no need for an additional sensor for detecting the pressure force with which the friction wheel is pressed against the motor vehicle wheel.

Further objects, features and advantages of the present invention will be apparent from the following description of preferred embodiments.

BRIEF DESCRIPTION OF THE DRAWING

FIG. 1 shows a first embodiment of apparatus according to the invention;

FIG. 2 shows the configuration of a torque-speed characteristic of an electric motor with adapted force switching thresholds which are used in the embodiment shown in FIG. 1; and FIG. 3 shows a second embodiment of apparatus according to the invention.

DESCRIPTION OF PREFERRED EMBODIMENTS

FIGS. 1 and 3 show a vehicle wheel 1 which is to be tested and measured to determine the unbalance thereof. Wheel 1 typically comprises a metal hub (not shown) on which a pneumatic tire 1a is fitted. The wheel 1 is lifted by means of a suitable wheel jacking device, as indicated at 3, so that the wheel 1 is freely rotatable for the unbalance measuring procedure to be carried out thereon. The wheel jacking device 3 can at the same time be in the form of a measuring stand as is known for example from German laid-open application (DE-OS) No 20 58 872. In that case the measuring stand is a component of the unbalance measuring apparatus and includes the measurement transducer for detecting centrifugal forces generated by unbalance of the wheel as it rotates.

The unbalance measuring apparatus also includes an evaluation unit (not shown) for evaluating measurement signals supplied by the measuring sensor or transducer, the evaluation unit being disposed in a housing 6 which is movable on rollers as indicated at 5.

The movable housing 6 also has a friction wheel 2 for driving non-driving wheels of the motor vehicle to be tested and for decelerating those wheels or for decelerating the driving wheels of the motor vehicle. Such an arrangement is disclosed for example in DE 38 28 724 A1 corresponding to U.S. Pat. No. 4,956,998 to which reference is therefore suitably directed.

The apparatus further includes a sensing roller 9 which, in the embodiments illustrated in FIGS. 1 and 3, is arranged to be applied to the tread surface of the pneumatic tire 1a of the motor vehicle wheel 1. Sensing roller 9, for example, can be carried on the wheel jacking device 3. The sensing roller 9 is provided with a signal generator which delivers an electrical signal that is proportional to the peripheral speed of the sensing roller 9, for example, in the form of a pulse train. That signal is passed to an evaluation unit as indicated at 10 for the peripheral speed. The evaluation unit 10 takes account of a contact periphery 17 at which the friction wheel 2 bears against the pneumatic tire of the motor vehicle wheel 1. In the illustrated embodiments, the contact periphery 17 is at the shoulder of the tire, that is to say at the transition between the tread surface and the side wall of the tire. The evaluation unit or circuit 10 produces an output signal which is proportional to the peripheral speed of the motor vehicle 1 at the contact periphery 17.

Reference numeral 18 in FIGS. 1 and 3 denotes a rotary speed measuring device or rotary speed sensor at the electric motor 4, for detecting the peripheral speed of the friction wheel 2 in the region of the contact periphery 17. A rotary speed sensor 18 of very simple design configuration is adequate for detecting the speed of rotation of the friction wheel 2. Preferably, the sensor 18 may be such for example as to sense the blades of a fan wheel as shown in FIG. 1 and indicated at 23 of the electric motor 4 and the sensor can thus be mounted to the fan casing, as in the embodiments of FIGS. 1 and 3. It is possible to use commercially available sensors which, for example, involve optical or inductive sensing.

The output signal of sensor 18 is proportional to the speed of rotation of the friction wheel 2 and is transmitted to an evaluation unit or circuit 11. The evaluation circuit 11 takes account of the periphery of the friction wheel 2, in the region of the contact periphery 17, and supplies an output signal which is thus proportional to the peripheral speed of the friction wheel 2 in the region of the contact periphery 17.

The output signals of the two evaluation circuits 10 and 11, which are proportional to the peripheral speeds of the motor vehicle wheel 1 and the friction wheel 2 at the contact periphery 17, are passed to a comparison unit or circuit 12. That comparison circuit 12 may also be in the form of a differencing circuit. The comparison circuit 12 establishes the difference between the two signals from the evaluation circuits 10 and 11, which are proportional to the respective peripheral speeds, and produces a corresponding output signal which is thus, in turn, proportional to any slippage between the friction wheel 2 and the motor vehicle wheel 1. That slippage proportional output signal of the comparison circuit 12 is passed in the first embodiment shown in FIG. 1 to a discontinuous regulating device indicated at 21. In the second embodiment, shown in FIG. 3, the slippage proportional output signal from circuit 12 is directed to a continuous or steady regulating device 22. The regulating devices 21 and 22 control the electric motor 4, in both the embodiments illustrated, in a manner which will be described in greater detail hereinafter.

In FIG. 1, a force measuring device 7 is disposed between the housing 6 or a housing frame structure 8 and the friction wheel 2. Force-measuring device 7 is in the form of a force sensor which measures the force applied thereto without performing a travel movement as a result of the applied force. In the illustrated embodiment the force-measuring device 7 is disposed between the housing of the electric motor 4 and the frame structure 8 of the movable housing 6. The force-measuring device 7 produces an analog signal which is proportional to the pressure or contact force with which the friction wheel 2 is pressed against the motor vehicle wheel 1. That output signal from the force-measuring device 7, being proportional to the friction wheel pressure contact force, is passed to a force comparator 15 formed by a suitable force-comparison circuit. In the force comparator 15, the signal from the force measuring device 7, which is proportional to the friction wheel pressure force, is compared to first and second switching thresholds in respect of given pressure forces which represent a switching-on threshold value as indicated at F2 in FIG. 2 and a switching-off threshold value as indicated at F1 in FIG. 2. The formation of those two switching thresholds F1 and F2 will now be described with reference to FIG. 2.

FIG. 2 shows the torque-speed characteristic $M_{motor}$ of the electric motor 4. The switching-off threshold (F1) and switching-on threshold (F2) correspond to the two different pressure forces with which the friction wheel 2 presses against the motor vehicle wheel 1 and are of a configuration which is approximately parallel to the motor characteristic $M_{motor}$. That is to say, the switching thresholds F1 and F2 vary with the speed of rotation and the torque of the electric motor 4, in the manner shown in FIG. 2. That means that the switching thresholds F1 and F2 are variable and are adapted to the currently obtaining speed of rotation of the wheel. The motor characteristic can be initially established for medium voltage and temperature conditions.

In order to obtain the switching thresholds F1 and F2 which are associated with respective motor speeds or respective drive torques of the motor, the signal from the evaluation circuit 10, which is proportional to the speed of rotation of the motor vehicle wheel, is passed to a characteristic value generator as indicated at 13 in FIG. 1. From the currently obtaining speed of wheel rotation, the generator 13 calculates the associated slippage-free speed of motor rotation and in dependence thereon, from the stored motor characteristic, transmits the associated motor characteristic value signals to a switching threshold generator 14. In proportion to the motor characteristic values, the switching threshold generator 14 calculates pressure forces in respect of the friction wheel 2 against the motor vehicle wheel 1, which are necessary in order for the torque of the drive motor 4 to be transmitted without slippage by way of the friction wheel 2. To deal with the above-mentioned factors such as operating voltage, temperature, frictional values and motor speed, which influence the freedom from slippage, medium standard factors are firstly employed and, in dependence thereon, the switching thresholds F1 and F2 for switching the motor 4 on and off are then generated. In that respect, the switching thresholds F1 and F2 take account of both any necessary switching hysteresis and also a safety margin. FIG. 2 shows the association of the pressure forces representing necessary switching thresholds, in respect of the friction wheel 2 against the motor vehicle wheel 1, with the curve configuration of the motor characteristic. Output signals from the switching threshold generator 14, which are proportional to the two switching thresholds F1 and F2, are passed to the comparator 15 in which the two switching thresholds are compared to the output signal from the force-measuring device 7.

If the pressure force with which the friction wheel 2 is pressed against the motor vehicle wheel 1 falls below a value corresponding to the switching-off threshold F1, that results in the admissible slippage limit being exceeded and the motor is then switched off. For the motor vehicle wheel 1 then to be further driven in rotation for unbalance measurement purposes, the operator of the apparatus must intervene so as to cause the friction wheel 2 to be pressed more firmly against the pneumatic tire of the motor vehicle wheel 1. When the pressure force corresponding to the switching-on threshold F2 is established, the motor is switched on again. To provide for that procedure of switching on and off the electric motor 4, or the supply current to the electric motor 4, the comparator 15 actuates a switching device 16 which for example can be in the form of a relay. The slippage-proportional output signal of the comparison unit 12 and the signal from the force-measuring device 7, that is proportional to the currently obtaining pressure force, are also passed to the switching threshold generator 14. By a comparison of all values, it is possible to detect the currently obtaining slippage limit and to adapt the motor characteristic to the actual voltage, temperature and frictional value conditions for establishing the required switching thresholds F1 and F2. In that respect it is possible to take account of a permissible tolerance which continually prevents the correction procedure from taking place. It is also possible to relinquish the parallel relationship of the switching-off threshold F1 with the motor characteristic $M_{motor}$ and to ascertain the switching Motor off point when the friction wheel 2 moves back, on the basis of the detected difference in the above-mentioned peripheral speeds which are compared in the comparison circuit 12.

The embodiment shown in FIG. 1 affords further advantages, by virtue of the signal from the force-measuring device 7, that is proportional to the pressure force between the friction wheel 2 and the motor vehicle 1. Any lateral tire runout can be detected on the basis of periodic fluctuations in the signal and indicated in dependence on direction in at least broadly general terms. It is also possible to ascertain whether there is contact between the friction wheel 2 and the motor vehicle wheel 1. In that way it is possible to automatically initiate a measuring cycle, both in relation to non-driving wheels of the motor vehicle and also in relation to driving wheels thereof, without the measurements being influenced by contact between the friction wheel 2 and the motor vehicle wheel 1.

In the embodiment shown in FIG. 3 regulation of the electric motor 4 is again dependent on the difference between the peripheral speed of the motor vehicle wheel 1 and the friction wheel 2 at the contact periphery 17. The signal proportional to the detected slippage between the motor vehicle wheel 1 and the friction wheel 2 is passed to the continuous or steady regulating device 22 which includes a regulator indicated at 19. To assure that the slippage or the above-mentioned difference in peripheral speeds at the contact periphery 17 remains within an established tolerance range, regulator 19 can be connected to a storage device 20 for storing suitable tolerance values. In that way it is possible for the torque or the speed of the electric motor 4 to be continuously matched to the currently obtaining pressure force in such a way that any slippage remains within the tolerance range specified.

The embodiment shown in FIG. 3 does not require a force measuring device for ascertaining the pressure force applied by the friction wheel 2 to the motor vehicle wheel 1. Further advantages are achieved by virtue of the fact that this embodiment provides that the speed of rotation of the motor is influenced by the regulation unit 22. Thus, when the drive is operating in a slippage-free manner, the speed of rotation of the motor vehicle wheel 1 can be influenced in an operator-friendly manner by varying the pressure force. In that way it is possible to cause the wheel 1 to rotate only at a low speed, for the purposes of visual checking thereof, while for balancing lighter motor vehicle wheels, more particularly for example private automobiles, using a balancing apparatus which is suitable for trucks, it is possible to reduce the pressure force in a slippage-free manner in order, for example, to prevent the vehicle from moving laterally if it is supported on two measuring stands supported on wheels, as are disclosed in above-mentioned German laid-open application (DE-OS) No 20 58 872. When the motor current is regulated by means of a frequency converter, throughout the complete acceleration procedure, the internal slippage of the motor (ratio of actual speed to synchronous speed) can be minimized and the motor torque can be optimized. In that case the thermal loading on the electric motor can be substantially reduced, in particular when balancing truck wheels which are difficult to move.

As is known, when measuring unbalance of the driving wheels of a motor vehicle, those wheels must firstly be set rotating on the axle at the required medium speed of rotation, by means of the vehicle engine. After that, the electric motor 4 of the balancing apparatus is used to produce the speed difference required for the measuring operation alternately by a braking or driving effect. For that operation, the motor speed can be adapted to the wheel speed before the friction wheel comes into contact with the pneumatic tire of the motor vehicle wheel. The same adaptation effect can also be provided when dealing with non-driving wheels of a motor vehicle, if the wheel while slowing down but still rotating has to be driven on a further occasion. The motor speed is the same for 50 and 60 Hz, that is to say, only one apparatus design configuration is required for the balancing apparatus. When a frequency converter is used, it is also possible to employ a three-phase motor, in the 1-phase mode of operation. A 1-phase configuration can thus be produced more easily and may be identical to the 3-phase configuration.

In both of the illustrated embodiments, the speed measuring device 18 for the electric motor 4 gives the additional advantage that, in a 1-phase mode of operation, the starting capacitor can be operated in the optimum fashion in dependence on speed both in the 50 Hz and in the 60 Hz mode.

Advantages are achieved when using either the continuous or steady mode of regulation or the discontinuous mode of regulation.

Any slippage between the friction wheel 2 and the motor vehicle wheel 1 to be tested is immediately detected and prevented by the action of the regulating system. It is also possible to provide for adaptation of the 'soft-drive' function to the speed-dependent torque of the motor, that is to say, its characteristic. It is also possible to provide for adaptation of the 'soft-drive' function to different mains voltages. Different frictional values as between the friction wheel 2 and the motor vehicle wheel 1 to be tested are automatically detected and suitably taken into account while any switching hysteresis can be optimized by means of adaptation to different conditions and modes of operation. It is also possible to effect automatic adaptation of the 'soft-drive' function to different types of wheels, for example and more particularly automobiles or trucks, the nature of which can be ascertained by means of the respective measurement stand to be used, which includes the jacking system. It is possible to ascertain whether the unbalance measuring procedure involves the driving wheels of the motor vehicle or the non-driving wheels thereof, on the basis of the number of measuring stands to be used. When dealing with the driving wheels, both driving wheels which are driven by the engine of the motor vehicle are jacked up and connected while when dealing with the non-driving wheels only one respective such wheel is connected to the electronic measuring system for carrying out the measuring operation.

It will be appreciated that the above-described methods and apparatuses according to the present invention have been set forth solely by way of example and illustration of the principles thereof and that various modifications and alterations may be made therein without thereby departing from the spirit and scope of the invention.

What is claimed is:

1. A method of driving a motor vehicle wheel while the motor vehicle wheel is mounted on a motor vehicle for the purposes of determining an unbalance of the wheel, said method comprising the steps of:

driving a friction wheel with an electric motor;

pressing the friction wheel against the motor vehicle wheel to drive said motor vehicle wheel at a speed of rotation required for an unbalance measuring operation;

measuring peripheral speeds of the friction wheel and the motor vehicle wheel at a contact periphery point between the friction wheel and the motor vehicle wheel;

measuring a pressure force with which the friction wheel is pressed against the motor vehicle wheel;

generating, using the peripheral speeds of the motor vehicle wheel and the friction wheel, a characteristic value which is variably adapted to torque-speed characteristics of the electric motor;

establishing actuation and deactuation threshold pressure forces, which are variable in response to said characteristic value, for pressing the friction wheel against the motor vehicle wheel;

comparing the measured pressure force with the actuation and the deactuation threshold pressure forces to obtain a comparison result; and regulating at least one of a speed of rotation and a torque of the electric motor by switching the electric motor on and off responsive to the comparison result.

2. A method as set forth in claim 1 wherein the step of regulating the motor includes the step of continuously regulating the torque of the electric motor in a steady regulation mode in response to differences between the measured peripheral speeds.

3. A method as set forth in claim 2 wherein the torque is so regulated that the differences between the measured peripheral speeds remains in a tolerance range.

4. A method as set forth in claim 1 wherein the step of regulating the electric motor includes the step of continuously regulating the speed of rotation of the electric motor in a steady regulation mode in response to differences between the measured peripheral speeds.

5. A method as set forth in claim 4 wherein the speed of rotation is regulated so that the differences between the measured peripheral speeds remains in a tolerance range.

6. An apparatus for driving a motor vehicle wheel while the motor vehicle wheel is mounted on a motor vehicle and is freely rotatable for purposes of determining unbalance measurement thereof, said apparatus comprising:

an electric motor;

a friction wheel driven by the electric motor;

a frame structure supporting said friction wheel;

means for pressing the friction wheel against the motor vehicle wheel to drive the motor vehicle wheel at a speed of rotation required for an unbalance measuring operation;

force measuring means, operatively disposed between the frame structure and said friction wheel, for measuring a pressure force with which said friction wheel presses against the motor vehicle wheel;

peripheral speed measuring means for measuring a peripheral speed of the motor vehicle wheel at a contact periphery point between the friction wheel and the motor vehicle wheel;

rotary speed measuring means for detecting a speed of rotation of the electric motor;

characteristic value generating means, connected to the rotary speed measuring means and to the peripheral speed measuring means, for producing, responsive to a respective speed of rotation of the electric motor, a characteristic value which is adapted to a torque-speed characteristic of the electric motor;

switching threshold value generating means, connected to said characteristic value generating means, for establishing pressure forces used as actuation and deactuation threshold values variably adapted to the characteristic value;

force comparison means, connected to the force measuring means and to the switching threshold value generating means, for comparing the actuation and deactuation threshold values to the measured pressure force and producing a force comparison result; and switching means, operatively connected to the force comparison means, for switching the electric motor on and off responsive to the force comparison result to regulate continuously at least one of a speed of rotation and a torque of the electric motor.

7. An apparatus as set forth in claim 6 wherein said peripheral speed measuring means comprises a sensing roller bearing against a portion of said motor vehicle wheel.

8. A method of driving a motor vehicle wheel while the motor vehicle wheel is mounted on a motor vehicle for the purposes of determining an unbalance of the wheel, said method comprising the steps of:

driving a friction wheel using an electric motor;

pressing the driven friction wheel against the motor vehicle wheel to drive the motor vehicle wheel at a speed of rotation required for an unbalance measuring operation;

measuring a peripheral speed of the friction wheel and a peripheral speed of the motor vehicle wheel at a contact periphery point between the friction wheel and the motor vehicle wheel;

continuously comparing said measured peripheral speed of the friction wheel and said measured peripheral speed of the motor vehicle wheel for ascertaining differences between said measured peripheral speed of the friction wheel and said measured peripheral speed of the motor vehicle wheel; and continuously regulating at least one of a speed of rotation and a torque of said electric motor so that said ascertained differences between the measured peripheral speeds of the friction wheel and the motor vehicle wheel remain within an established tolerance range.

9. A method as set forth in claim 8 wherein:

the step of continuously regulating the electric motor includes the step of switching the motor on and off to provide a discontinuous regulation; and said pressing step employs predetermined pressure forces which are used as actuation and deactuation threshold values for switching the motor on and off, at least the actuation threshold value being variable in response to torque-speed characteristics of the electric motor.

10. A method as set forth in claim 8 wherein the step of continuously regulating the electric motor includes the step of continuously regulating the speed of rotation of the electric motor in a steady regulation mode in response to the differences between the measured peripheral speeds.

11. A method as set forth in claim 10 wherein the speed is regulated so that a difference between the measured peripheral speeds remains in a tolerance range.

12. An apparatus for driving a motor vehicle wheel while the motor vehicle wheel is mounted on a motor vehicle and freely rotatable for purposes of determining an unbalance measurement thereof, said apparatus comprising:

an electric motor;

a friction wheel driven by the electric motor;

means for pressing the friction wheel against the motor vehicle wheel for driving the motor vehicle wheel at a speed of rotation required for an unbalance measuring operation;

first speed measuring means, operatively associated with the motor vehicle wheel, for measuring a peripheral speed of the motor vehicle wheel at a contact periphery point at which the friction wheel bears against the motor vehicle wheel;

second speed measuring means, operatively associated with the friction wheel, for measuring a peripheral speed of the friction wheel at said contact periphery point;

comparison means, connected to the first and second speed measuring means, for continuously comparing measured peripheral speeds of the motor vehicle wheel and the friction wheel; and continuous regulating means, connected to the comparison means, to regulate at least one of a speed of rotation and a torque of said electric motor so that a difference of the measured peripheral speeds of the motor vehicle wheel and the friction wheel at said contact periphery point remains within an established tolerance range.

13. An apparatus as set forth in claim 12 wherein said first speed measuring means comprises a sensing roller bearing against a portion of said motor vehicle wheel.

14. Apparatus as set forth in claim 12 wherein said second speed measuring means comprises a rotary speed measuring means operable to detect the speed of rotation of the electric motor.

15. An apparatus as set forth in claim 12 and further including:

a frame structure supporting said friction wheel;

force measuring means operatively disposed between the frame structure and said friction wheel and operable to measure a force with which said friction wheel presses against the motor vehicle wheel to be measured;

rotary speed measuring means for detecting the speed of rotation of the electric motor; and characteristic value generating means connected to the rotary speed measuring means and operable to produce in dependence on the speed of rotation of the electric motor a characteristic value which is adapted to torque-speed characteristics of the electric motor;

wherein the regulating means is in the form of a discontinuous regulating means for regulating at least one motor parameter selected from a group consisting of the speed of rotation of said motor and the torque of the electric motor by switching the electric motor on and off in dependence on the force, measured by said force measuring means, rising above an actuation threshold value and falling below a deactuation threshold value, respectively, for said at least one motor parameter, at least the actuation threshold value being adapted to said torque-speed characteristics of said electric motor.

16. An apparatus as set forth in claim 15 including:

switching threshold value generating means in the regulating means, connected to said characteristic value generating means, for establishing the pressure forces that form the switching-on and switching-off values, at least the switching-on threshold value being variably adapted to a corresponding characteristic value;

force comparison means in the regulating means, connected to the force measuring means and to the switching threshold value generating means, for comparing the actuation and deactuation threshold values to a corresponding measured pressure force; and switching means, operatively connected to the force comparison means, in the regulating means for switching the electric motor current on and off in dependence on the comparison result.

* * * * *